(12) United States Patent
Mathai

(10) Patent No.: US 11,625,362 B2
(45) Date of Patent: *Apr. 11, 2023

(54) FOLDER KEY MANAGEMENT

(71) Applicant: SAP SE, Walldorf (DE)

(72) Inventor: Jackson Mathai, Frankfurt (DE)

(73) Assignee: SAP SE, Walldorf (DE)

( * ) Notice: Subject to any disclaimer, the term of this patent is extended or adjusted under 35 U.S.C. 154(b) by 15 days.

This patent is subject to a terminal disclaimer.

(21) Appl. No.: 17/313,057

(22) Filed: May 6, 2021

(65) Prior Publication Data

US 2021/0255989 A1 Aug. 19, 2021

Related U.S. Application Data

(63) Continuation of application No. 16/101,840, filed on Aug. 13, 2018, now Pat. No. 11,023,419.

(51) Int. Cl.
*G06F 16/17* (2019.01)
*G06F 16/16* (2019.01)
*G06F 16/14* (2019.01)
*G06F 16/176* (2019.01)

(52) U.S. Cl.
CPC .......... *G06F 16/168* (2019.01); *G06F 16/152* (2019.01); *G06F 16/1774* (2019.01)

(58) Field of Classification Search
CPC ... G06F 16/168; G06F 16/1774; G06F 16/152
USPC ...................................................... 707/822
See application file for complete search history.

(56) References Cited

U.S. PATENT DOCUMENTS

| 6,023,506 | A | 2/2000 | Ote et al. |
| 6,061,692 | A | 5/2000 | Thomas et al. |
| 7,080,361 | B2* | 7/2006 | Aigen ................... G06F 16/289 |
| | | | 717/137 |
| 7,191,180 | B2 | 3/2007 | Evans et al. |
| 7,272,654 | B1 | 9/2007 | Brendel |
| 7,668,953 | B1 | 2/2010 | Sinclair et al. |
| 8,156,092 | B2* | 4/2012 | Hewett ................... G06F 16/93 |
| | | | 707/758 |
| 8,332,423 | B2* | 12/2012 | Xia ......................... H04L 63/08 |
| | | | 726/28 |
| 8,484,631 | B2 | 7/2013 | Mortensen |

(Continued)

*Primary Examiner* — Hanh B Thai
(74) *Attorney, Agent, or Firm* — Sterne, Kessler, Goldstein & Fox P.L.L.C.

(57) ABSTRACT

Disclosed herein are system, method, and computer program product embodiments for generating folder keys and using folder keys to access folder paths. In an embodiment, a computer system may instantiate a graphical user interface (GUI) to display folder and sub-folder contents as well as a folder key. A user may input a folder key as a representation of the displayed sub-folder of the corresponding folder path. The folder key may include one or more symbols that the computer system may store and associate with the folder path. Using the folder key, the computer system may retrieve a particular sub-folder, manage security or permissions related to folders, and/or facilitate navigation between sub-folders. Using a folder key may aid a user in quickly navigating to a particular sub-folder and may allow a computer system to avoid loading unnecessary intermediate sub-folders as a user navigates to a particular desired sub-folder.

20 Claims, 13 Drawing Sheets

(56) References Cited

U.S. PATENT DOCUMENTS

| | | | |
|---|---|---|---|
| 8,776,031 B1 | 7/2014 | Goodwin et al. | |
| 8,832,148 B2 | 9/2014 | Kisin et al. | |
| 8,832,466 B1 | 9/2014 | McGregor et al. | |
| 8,996,884 B2 | 3/2015 | Hartley | |
| 9,146,930 B2 | 9/2015 | Tang | |
| 10,785,282 B2* | 9/2020 | Lyons | G06F 16/958 |
| 2002/0023085 A1 | 2/2002 | Keith | |
| 2005/0210080 A1* | 9/2005 | Saika | G06F 11/1458 |
| 2006/0004725 A1 | 1/2006 | Abraido-Fandino | |
| 2006/0020789 A1 | 1/2006 | Gipps et al. | |
| 2006/0195461 A1 | 8/2006 | Lo et al. | |
| 2006/0288056 A1* | 12/2006 | Yamakawa | G06F 16/1873 |
| | | | 707/999.203 |
| 2007/0050137 A1 | 3/2007 | Woon et al. | |
| 2007/0055715 A1 | 3/2007 | Achiwa | |
| 2007/0136328 A1* | 6/2007 | Carro | G06Q 10/107 |
| 2009/0192978 A1* | 7/2009 | Hewett | G06F 16/174 |
| 2009/0193210 A1 | 7/2009 | Hewett et al. | |
| 2010/0095279 A1* | 4/2010 | Chou | G06F 11/3672 |
| | | | 717/128 |
| 2010/0185852 A1 | 7/2010 | Ogawa et al. | |
| 2011/0145296 A1 | 6/2011 | Ellison et al. | |
| 2011/0196892 A1* | 8/2011 | Xia | H04L 63/126 |
| | | | 707/769 |
| 2011/0197162 A1 | 8/2011 | Paulik et al. | |
| 2012/0066274 A1 | 3/2012 | Stephenson | |
| 2012/0092346 A1 | 4/2012 | Ording et al. | |
| 2012/0110142 A1 | 5/2012 | Montagna et al. | |
| 2012/0143931 A1* | 6/2012 | Rosenberger | G06F 16/168 |
| | | | 707/828 |
| 2012/0144315 A1* | 6/2012 | Rosenberger | G06F 16/14 |
| | | | 707/828 |
| 2012/0173511 A1* | 7/2012 | Eto | G06F 16/14 |
| | | | 707/711 |
| 2012/0173642 A1* | 7/2012 | Rosenberger | G06F 16/48 |
| | | | 709/204 |
| 2013/0254076 A1 | 9/2013 | Thomas | |
| 2013/0254720 A1 | 9/2013 | Qi | |
| 2013/0297645 A1 | 11/2013 | Foresti | |
| 2013/0318357 A1 | 11/2013 | Abraham et al. | |
| 2014/0195516 A1* | 7/2014 | Balakrishnan | G06F 16/168 |
| | | | 707/722 |
| 2014/0201141 A1 | 7/2014 | Vibhor et al. | |
| 2014/0208124 A1 | 7/2014 | Hartley | |
| 2014/0298172 A1 | 10/2014 | Choi | |
| 2014/0351516 A1 | 11/2014 | Larimore et al. | |
| 2015/0261972 A1 | 9/2015 | Lee | |
| 2015/0281284 A1 | 10/2015 | Cho | |
| 2015/0302111 A1* | 10/2015 | Yue | G06F 16/84 |
| | | | 707/827 |
| 2016/0063043 A1 | 3/2016 | Carroll et al. | |
| 2016/0110406 A1 | 4/2016 | Zircher et al. | |
| 2016/0219162 A1* | 7/2016 | Miyamoto | H04N 1/00244 |
| 2017/0177194 A1* | 6/2017 | Lyons | H04L 67/06 |
| 2018/0039652 A1 | 2/2018 | Nichols | |
| 2018/0081650 A1 | 3/2018 | Larin et al. | |
| 2018/0322136 A1* | 11/2018 | Carpentier | G06F 9/45558 |
| 2019/0147078 A1* | 5/2019 | Dageville | G06F 16/2365 |
| | | | 707/695 |
| 2019/0171729 A1* | 6/2019 | Christiansen | G06F 16/184 |
| 2019/0197186 A1 | 6/2019 | Bhattachaijee et al. | |
| 2019/0370378 A1 | 10/2019 | Adalian et al. | |
| 2020/0019410 A1 | 1/2020 | Dima et al. | |
| 2020/0034129 A1 | 1/2020 | Venkataraman | |

\* cited by examiner

600

```
┌─────────────────────────────────────────────────┐         610
│ Detect Navigation to a Folder Path via a Graphical User │
│ Interface (GUI), Wherein the Folder Path Includes One or│
│                More Sub-Folders                 │
└─────────────────────────────────────────────────┘
                        │
                        ▼
┌─────────────────────────────────────────────────┐         620
│ Receive an Interaction with a Portion of the GUI to Assign│
│         a Folder Key to the Folder Path         │
└─────────────────────────────────────────────────┘
                        │
                        ▼
┌─────────────────────────────────────────────────┐         630
│ Assign One or More Symbols of the Folder Key to One or│
│         More Sub-Folders of the Folder Path     │
└─────────────────────────────────────────────────┘
                        │
                        ▼
┌─────────────────────────────────────────────────┐         640
│ Store the Folder Key in Memory with An Association to│
│                 the Folder Path                 │
└─────────────────────────────────────────────────┘
                        │
                        ▼
┌ ─ ─ ─ ─ ─ ─ ─ ─ ─ ─ ─ ─ ─ ─ ─ ─ ─ ─ ─ ─ ─ ─ ─ ┐         650
  Store Metadata Associating the One or More Symbols of
│ the Folder Key to the One or More Sub-Folders of the │
                       Folder Path
└ ─ ─ ─ ─ ─ ─ ─ ─ ─ ─ ─ ─ ─ ─ ─ ─ ─ ─ ─ ─ ─ ─ ─ ┘
```

FIG. 6

FOLDER KEY MANAGEMENT

CROSS-REFERENCE TO RELATED APPLICATIONS

This application is a Continuation of U.S. application Ser. No. 16/101,840, filed on Aug. 13, 2018, which is hereby incorporated by reference in its entirety.

BACKGROUND

As computer users generate more computer files, computer users tend to organize the files into folders. Storing digital files in a folder allows users to categorize and organize files in a custom manner according to the user's desires. Also, when a user uses software or other applications, files associated with the software or application are also organized into folders. Over time, however, users may exponentially grow the number of folders used. Users may even use sub-folders within a folder. The use of sub-folders may gradually lengthen the folder path. Long folder paths, however, are difficult for users to remember. Users may not remember the full sequence of sub-folders when attempting to reach a desired folder path. Although a user may navigate to a folder using a graphical user interface (e.g., clicking through folders to reach a desired sub-folder), this navigation is also cumbersome and time-consuming. A user may mistakenly navigate to an incorrect sub-folder or search through multiple sub-folders before finding the desired folder. Computer resources are wasted retrieving these sub-folders and displaying their contents. Graphical user interface navigation does not allow a user to quickly access a desired folder or sub-folder and leads to wasted computational resources.

BRIEF DESCRIPTION OF THE DRAWINGS

The accompanying drawings are incorporated herein and form a part of the specification.

FIG. 6 depicts a flowchart illustrating a method for generating a folder key, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1A:
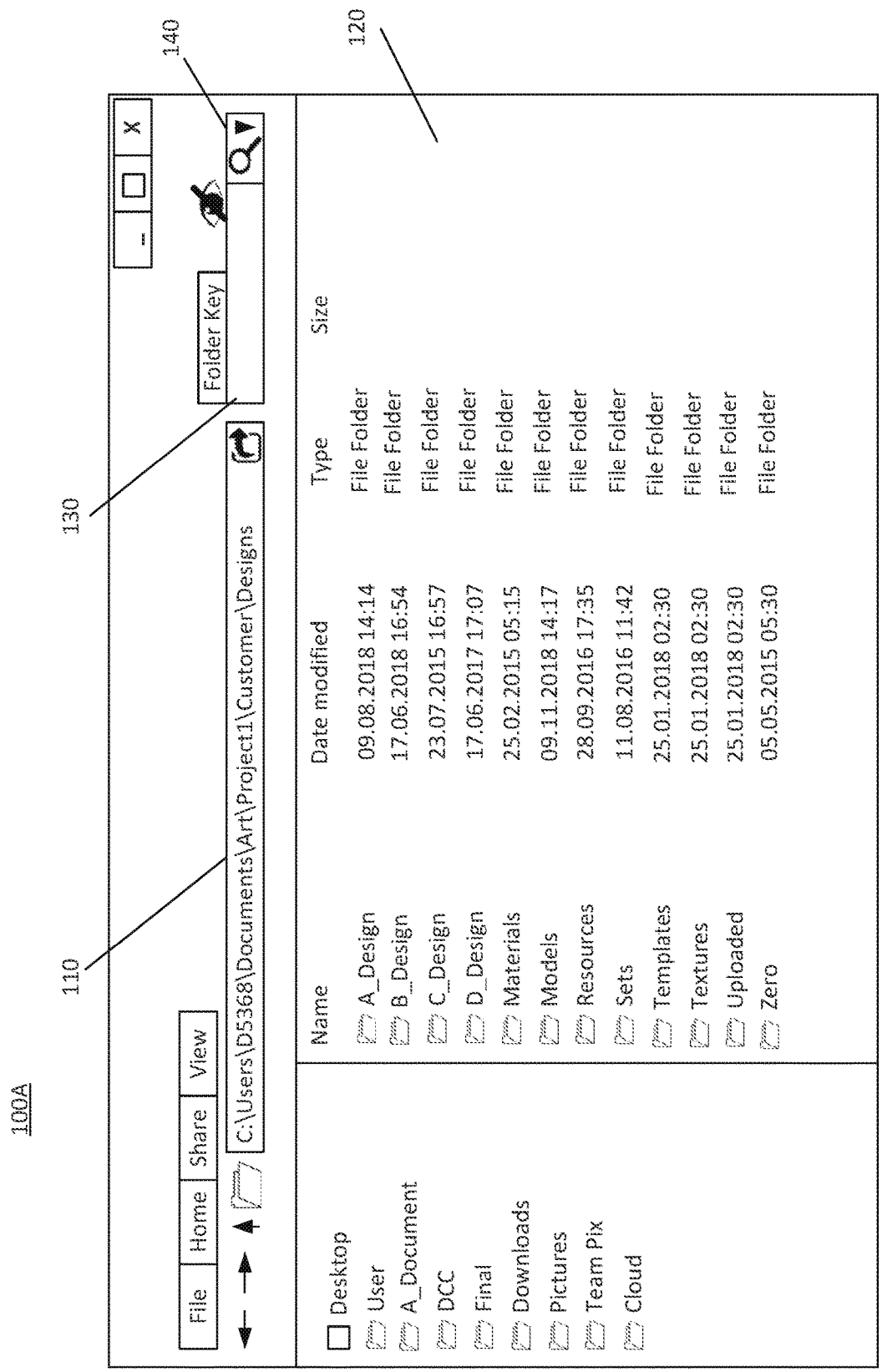
FIG. 1A depicts a block diagram of a graphical user interface (GUI) displaying a folder path, according to some embodiments.

Provided herein are system, apparatus, device, method and/or computer program product embodiments, and/or combinations and sub-combinations thereof, for generating folder keys and using folder keys to access folder paths.

In an embodiment, a folder key data structure may allow a user to a quickly navigate to a desired folder path. A folder path may correspond to a hierarchy of sub-folders for organizing data in computer memory. The folder key may be a collection of symbols, such as, for example, characters and/or numbers, that represent a folder path. The folder key may be shorter than a full-length folder path, allowing a user to more easily remember the folder key rather than a full-length folder path. A user may assign a folder key to a folder path. A user may then utilize a folder key to quickly navigate to a folder path corresponding to the folder key. Further, a user may give and/or send the folder key to another user to use as a quick link to the folder path.

In a non-limiting example, a folder path may include one or more sub-folders and may take a form similar to the folder path listed below:

"C:\Users\D5368\Documents\Art\Project1\Customer\Designs"

The folder key may be a shortened version of the folder path. For example, a folder key may be the word "PROJECT". When a user supplies the folder key, a computer system implementing the folder key data structure may navigate to the corresponding folder path. For example, the computer system may display a graphical user interface (GUI) window indicating the full folder path and/or display the file contents contained in the folder corresponding to the folder path. In this manner, a user may avoid the cumbersome task of navigating through subfolders to reach a desired sub-folder. Also, rather than remembering the full folder path, the user is able to supply the shorter folder key (e.g., PROJECT) to the computer system to navigate to the desired sub-folder. This folder key data structure reduces a user's time spent navigating between folders. In an embodiment, a user may still use the familiar GUI navigation along with the folder key data structure to view and manipulate the files stored in the folders retrieved using the folder key.

By implementing the folder key data structure, computer systems are better able to organize relevant folders to more efficiently access a desired sub-folder. For example, the computer system may avoid displaying the contents of each intermediate sub-folder on a GUI before reaching the desired sub-folder. The computer system is thus able to save system resources because the computer system avoids retrieving the content for each intermediate sub-folder and/or avoids displaying this content for each intermediate sub-folder that is opened. Instead, after receiving the folder key, the computer system is able to directly retrieve the contents stored in the sub-folder corresponding to the folder key. The folder key allows the computer system to save system resources in processing intermediate sub-folders.

In an embodiment, a user may generate the folder key or a computer system implementing the folder key data structure may supply the folder key at a user's request. As will be further discussed below, the symbols of the folder key may correspond to sub-folders of the folder path. Using a subset of the symbols may allow a user to navigate between different sub-folders of the folder path.

Additionally, computer systems may use folder keys to manage permissions, rights, and/or privacy protections related to folders. For example, some folder keys may be marked as public. In an embodiment, a public folder key may correspond to a public folder and may grant access to users supplying the public folder key. Private folder keys, however, may check user account and/or identification information before allowing a user to use the folder key to access a folder. For example, a folder key may grant access to certain designated users. The folder key may exclude users that have not been designated. In this manner, a computer system may use the folder key data structure as a rights management structure. For example, in an embodiment, the folder key may act as a password for the particular folder. Implementing the folder key data structure allows a computer system to efficiently manage rights to different folders. The folder key data structure may also provide the capability of mixing public, private, and user-designated permissions within a sub-folder structure. This mixing of permissions may be useful in a cloud computing or computer network context where multiple users utilize a shared folder management system.

The folder key data structure may also allow the manipulation and/or movement of folders between folders. As described below, a user may be able to drag and/or drop folders having a folder key. The computer system may track these changes and maintain the corresponding portions of the folder key. Maintaining the folder key structure may allow a user to still reach the desired sub-folder even if a higher-tiered folder containing the desired sub-folder has been moved.

As will be described, the use of the folder key data structure provides an efficient structure for folder and/or sub-folder navigation. Folder keys allow computer systems to avoid costly retrievals of files from intermediate sub-folders. Additionally, folder keys allow a user to more easily remember and/or share folder paths. Users may quickly navigate to a specific sub-folder and may avoid the cumbersome task of checking intermediate sub-folders before determining the correct folder path.

These features of example embodiments will now be discussed in greater detail with respect to the corresponding figures.

FIG. 1A depicts a block diagram of a graphical user interface (GUI) 100 displaying a folder path, according to some embodiments. A computer system, such as, for example, computer system 800 described with reference to FIG. 8, may display GUI 100. The computer system may be a local computer, such as, for example, a desktop or a laptop. In an embodiment, the computer system may be a mobile device, such as, for example, a smart phone or tablet. In an embodiment, the computer system may be a computer network, such as, for example, a cloud computing platform or a software as a service platform. The computer system may utilize one or more servers and/or databases. A computer user may access GUI 100 via an Internet browser. In an embodiment, the computer system may instantiate GUI 100.

GUI 100 may be a display interface that allows a user to navigate between folders and/or other file organizing structures. For example, GUI 100 may include a window allowing a user to browse through saved files, applications, and/or software. A user may use GUI 100 to access sub-folders and/or to access files stored in folders. GUI 100 may utilize icons to allow navigation and/or may receive character strings to navigate. GUI 100 may allow a user to interact with files and/or folders managed by the computer system.

In an embodiment, the computer system may utilize a folder key data structure. When instantiating GUI 100, the computer system may generate a number of portions of GUI 100 allowing a user to navigate folders and/or to use folder keys. These portions of GUI 100 may include folder path interface 110, content interface 120, folder key interface 130, and/or menu 140.

Folder path interface 110 may be a portion of GUI 100 that displays the currently selected folder. For example, a user may have utilized GUI 100 to navigate to a particular folder. The user may have typed the folder path and/or may have interacted with icons to arrive at the displayed folder. The computer system instantiating GUI 100 may track the folder path displayed on folder path interface 110. After navigating to the folder path indicated in folder path interface 110, the computer system may display the contents of the folder corresponding to the folder path.

Content interface 120 may display the contents of the folder corresponding to the folder path indicated in folder path interface 110. The contents may include files, shortcuts, and/or sub-folders among other stored data. Using content interface 120, a user may view and/or manipulate the contents. For example, if the content includes a word processing document, a user may view and/or edit the document. The user may also delete the document and/or move the document to a different folder or sub-folder. Other file types may include documents, spreadsheets, presentations, diagrams, audio files, video files, shortcuts, links, and/or other stored data.

If the computer system has implemented a folder key data structure, GUI 100 may include folder key interface 130. Folder key interface 130 may be a portion of GUI 100 that displays a folder key. The folder key may be a collection of symbols, such as, for example, characters and/or numbers, that represent a folder path. An example embodiment of a folder key interface 130 displaying a folder key is discussed below with reference to FIG. 1C. In an embodiment, the folder key displayed in folder key interface 130 may correspond to the folder path displayed in folder path interface 110.

In an embodiment, a user may navigate to a particular folder path using content interface 120 and/or folder path interface 110. For example, a user may click icons on content interface 120 to reach a particular folder path. Similarly, a user may enter a folder path into folder path interface 110. The user may type the folder path or portions of the folder path into folder path interface 110. The user may also copy or paste a folder path into folder path interface 110. After navigating to a particular folder path, a user may view and/or assign a folder key to the folder path displayed.

GUI 100 may display the folder key corresponding to the folder path in folder key interface 130. If a folder key has previously been assigned to the folder path displayed, folder key interface 130 may display the previously assigned folder key. If the folder path is not associated with an assigned folder key, the user may have the option to assign a new folder key to the folder path. Viewing and/or assigning a folder key to a folder path will be further described below with reference to the example embodiments depicted in FIG. 1B and FIG. 1C.

Figure 1B:
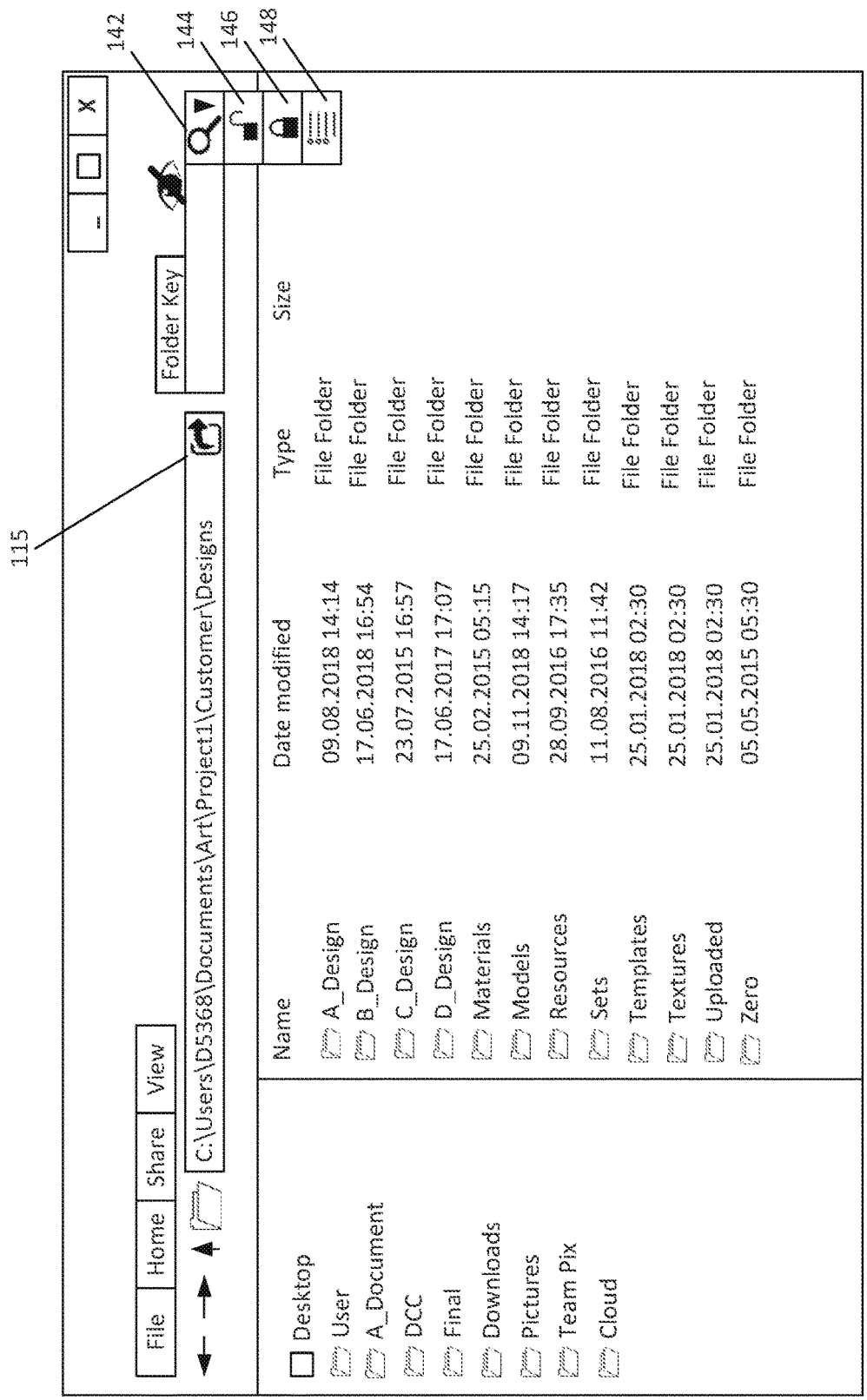
FIG. 1B depicts a block diagram of a GUI displaying folder key options, according to some embodiments.

Menu 140 is a portion of GUI 100 allowing a user to view customization options related to folder keys. Menu 140 may be an icon, button, list, drop-down list, and/or other graphical element allowing a user to select a folder key option. FIG. 1B depicts a block diagram of GUI 100 displaying folder key options, according to some embodiments. For example, when a user selects menu 140, GUI 100 may unhide and/or expand the options and display the folder key options available and/or implemented by the computer system. The folder key options may be displayed using icons and/or buttons and may include a search icon 142, a public assignment icon 144, a private assignment icon 146, and/or a key list icon 148. When a user selects one or more of the options from menu 140, the computer system implementing the folder key data structure may execute instructions corresponding to the icons.

For example, when a user selects search icon 142, the computer system may search for a folder path corresponding to a folder key. A user may input a folder key into folder key interface 130 and select search icon 142. Selecting search icon 142 may indicate a submission of the folder key and/or may act as a command causing the computer system to retrieve the folder path corresponding to the folder key. In an embodiment, search icon 142 may be pre-selected and/or may be toggled to allow for computer system input monitoring. For example, the computer system may monitor inputs to folder key interface 130 (e.g., when a folder key is being typed) to predict the folder path that may correspond to the folder key. The predictive folder path determination may allow GUI 100 to display a folder path prediction in real-time as a user inputs portions of a folder key.

Menu 140 may include public assignment icon 144 and/or private assignment icon 146. A user may utilize public assignment icon 144 and/or private assignment icon 146 to assign a folder key to a folder path. In an embodiment, the computer system may utilize a single button or icon for assigning a folder key. The single button may grant public and private options. In an embodiment, the computer system may not allow the selection between a private folder key and a public folder key. Instead, the computer system may not utilize a distinction depending on the configuration of an administrator of the computer system.

To use public assignment icon 144 and/or private assignment icon 146, a user may first navigate to a particular folder path using folder path interface 110 and/or content interface 120. The user may then enter a desired folder key in folder key interface 130. In an embodiment, the user may select folder key interface 130 and type a desired folder key. GUI 100 may display the typed folder key in folder key interface 130. The user may then select menu 140. GUI 140 may then display public assignment icon 144 and/or private assignment icon 146. The user may then select either public assignment icon 144 and/or private assignment icon 146 to assign the folder key to the folder path.

When the user selects public assignment icon 144, the computer system may categorize the inputted folder as public. A public folder key may be a folder key usable by users of the computer system without an added layer of user credential security. For example, when receiving the public folder key as an input to folder key interface 130, the computer system may grant access to the corresponding folder path without checking for user rights and/or permissions. A user may choose to designate a folder key as public for various reasons. For example, a public folder key may be more convenient. After designating the folder key as public by, for example, selecting public assignment icon 144, the computer system may store a record in memory associating the folder key with the folder path and designating the folder key as public.

In an embodiment, a user may select private assignment icon 146 to designate a folder key as private. A private folder key may be a folder key accessible by specified users. If a user attempts to use a private folder key but has not been granted permission, the computer access may deny access to the user.

In an embodiment, when a user types a folder key into folder key interface 130 and selects private assignment icon 146, the computer system may prompt the user to supply information related to individuals allowed to use the private folder key to access the folder path. The user may supply contact information, such as, for example, other names, user identifications, and/or contact information to the computer system to designate individuals allowed to use the private folder key.

In an embodiment, another user at a later time may input the private folder key into folder key interface 130. When the private folder key is provided in folder key interface 130, the computer system may check user identification information to determine if provided user identification information matches stored user identification information associated with the private folder key. If the identification information matches, the computer system may grant access and display the folder path and its contents in GUI 100. If the identification information does not match, the computer system may deny access and/or may prompt the user with a notification indicating that access has been denied. This notification may appear on GUI 100.

Using a private folder key may allow a user to control access to folders and/or sub-folders. In this manner, the private folder key may act as a password and/or a data structure for rights management. For example, in an embodiment, the computer system may not grant access to a folder unless a folder key has been provided. In an embodiment, the computer system may hide the folder such that a user is not able to browse to locate the folder. In this embodiment, the computer system may require the input of the private folder key in order to display the folder and/or grant access to the contents of the folder. In an embodiment, the computer system may also implement the user-based security layer described above in addition to hiding the folder for added security. In this case, a private folder may be invisible to a non-designated user and only designated users may be able to utilize the private folder key.

In an embodiment, the computer system may allow mixed permissions related to the folders and/or the folder key. For example, certain sub-folders of a folder path may be designated as private while certain sub-folders may be public. This mixed permission structure will be further discussed below with reference to FIG. 1C.

Returning to the folder key options of menu 140, menu 140 may also include key list icon 148. Selecting key list icon 148 may display saved folder keys. A user may view folder keys, folder paths, and/or permissions using key list icon 148. An embodiment of this list of saved folder keys is described further with respect to FIG. 4.

In addition to the folder key options displayed using menu 140, GUI 100 may also include a share icon 115. A user may utilize share icon 115 to share a folder path and/or share a folder key with a user. For example, selecting share icon 115 may cause the computer system to display a prompt box allowing a user to designate individuals. In an embodiment, the computer system may implement the sharing elements with the security elements of a private folder key. For example, sharing a private folder key may signal to the computer system that the user wishes to also grant permission to the individual receiving the private folder key. The computer system may automatically grant the designated individual permission and/or store identification information corresponding to the designated individual in memory corresponding to the folder key.

In an embodiment, when a user selects share icon 115, the computer system may deliver the folder path and/or the folder key as an electronic message, such as, for example, an email, an instant message, or a SMS message to individuals specified by the user. In an embodiment, the GUI 100 may display prompt 360 as described with reference to FIG. 3 in response to a selection of share icon 115. In an embodiment, the computer system implementing the folder key data structure may be executing on a network. The electronic message may be a messaging protocol internal to the network.

Figure 1C:
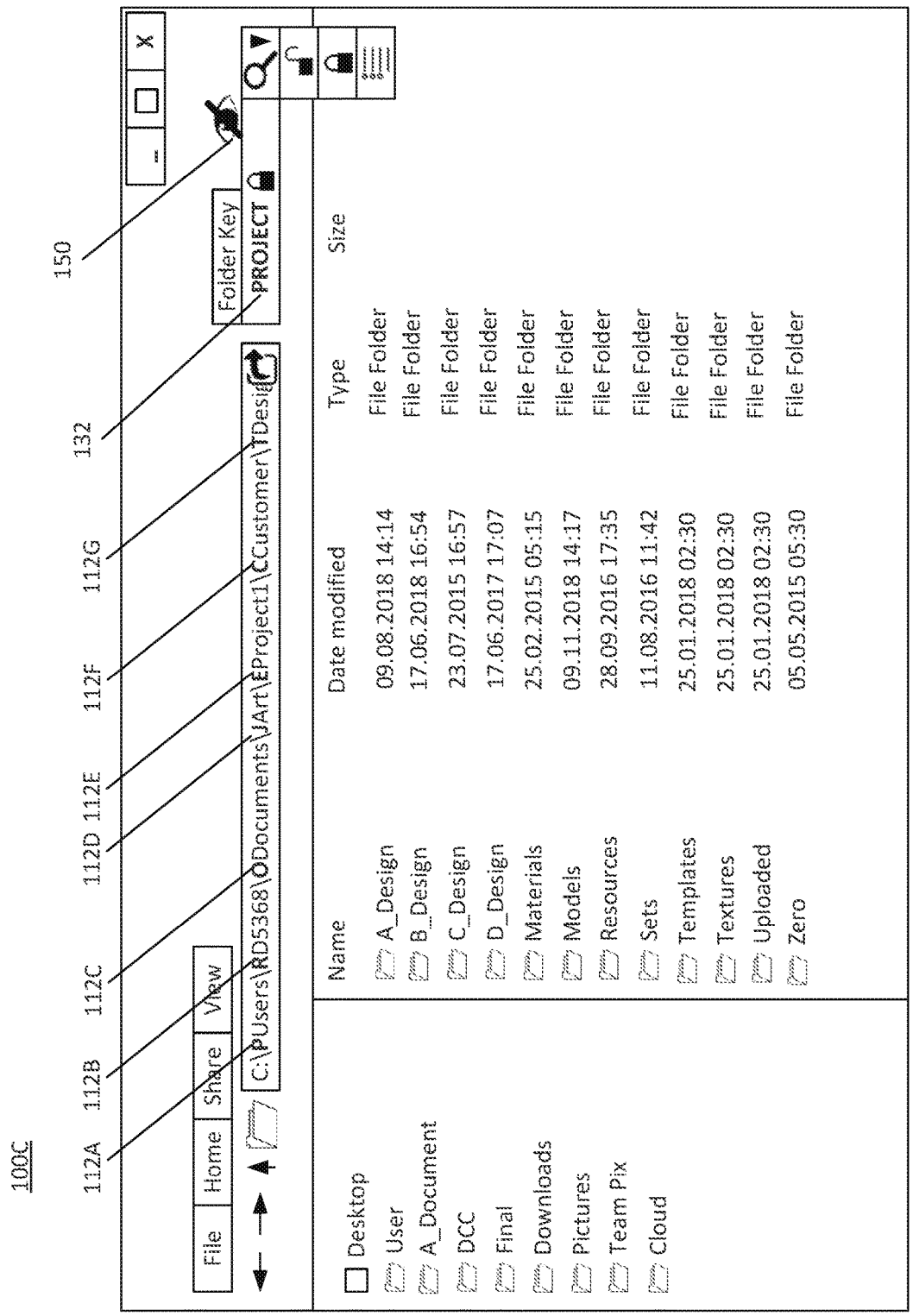
FIG. 1C depicts a block diagram of a GUI displaying a folder key, according to some embodiments.

FIG. 1C depicts a block diagram of GUI 100 displaying a folder key 132, according to some embodiments. In an embodiment, FIG. 1C may depict a folder path located in folder path interface 110. The folder path include one or more sub-folders. An example folder path may be:

"C:\Users\D5368\Documents\Art\Project1\Customer\Designs"

FIG. 1C also displays an embodiment of a folder key 132. A user may have navigated to the folder path displayed in GUI 100. The user may then input folder key 132 in folder key interface 130. Folder key 132 may indicate a desired shortened version of the folder path. For example, to represent the above folder path, the user may input the folder key 132 "PROJECT". The user may type folder key 132 into folder key interface 130. The user may then designate the folder key as a public folder key using public assignment icon 144 and/or may designate the folder as a private folder key using private assignment icon 146. The computer system may then store the provided folder key in memory.

In an embodiment, after a user has supplied folder key 132, the computer system may parse folder key 132 into symbols 112 and assign the symbols 112 to the sub-folders of the folder path. For example, the symbols 112 of the folder key 132 "PROJECT" may be each letter of the folder key. Other symbols 112 may include letters, numbers, and/or other text symbols that may be entered by a user using, for example, a keyboard or GUI keyboard input.

In an embodiment, the computer symbol may assign each symbol 112 to a sub-folder. For example, the "P" symbol 112A may be assigned to the first sub-folder of the folder path and the "R" symbol 112B may be assigned to the second sub-folder of the folder path. The computer system may continue assigning the symbols 112 to corresponding sub-folders of the folder path. The computer system may assign the symbols 112 to the subfolders and store this association in memory. The computer system may display the symbols 112 next to each sub-folder of the folder path depicted in folder path interface 110.

In an embodiment, if folder key 132 includes the same number of symbols 112 as sub-folders, the computer system may utilize a one-to-one correspondence. If folder key 132 includes more symbols 112 than sub-folders, the computer system may use more than one symbol for a sub-folder. For example, if the folder key is "PROJECTS", the computer system may assign "PR" as the first symbol 112A and assign the remaining symbols to the remaining sub-folders. In an embodiment, the folder key may be sentence and the computer system may assign the folder key in a similar manner.

A user may define a folder key 132 using a number of symbols 112 fewer than the number of sub-folders. In this case, the computer system may associate the symbols 112 with the deepest sub-folders. For example, if a user defines a folder key 132 as a single symbol "@", the computer system may assign the symbol to symbol 112G as the deepest sub-folder of the depicted folder path. In this case, when a user inputs the "@" folder key 132 into folder key interface 130, the computer system may retrieve the complete folder path. The user may use multiple symbols such as "D1". In this case, the computer system may start from the deepest sub-folder and assign symbols upward in the hierarchy. For example, the computer system may assign "1" to symbol 112G and "D" to the symbol 112F. In this manner, a user may define a folder key 132 with a desired length, and the computer system may adapt the folder key to the corresponding sub-folders.

In addition to the folder key options displayed in menu 140, GUI 100 may include hide icon 150. Hide icon 150 may be a toggle button to display and/or hide folder key 132 and/or symbols 112. When show icon 150 is set to display folder key 132, GUI 100 may display folder key 132 and/or symbols 112.

Figure 1D:
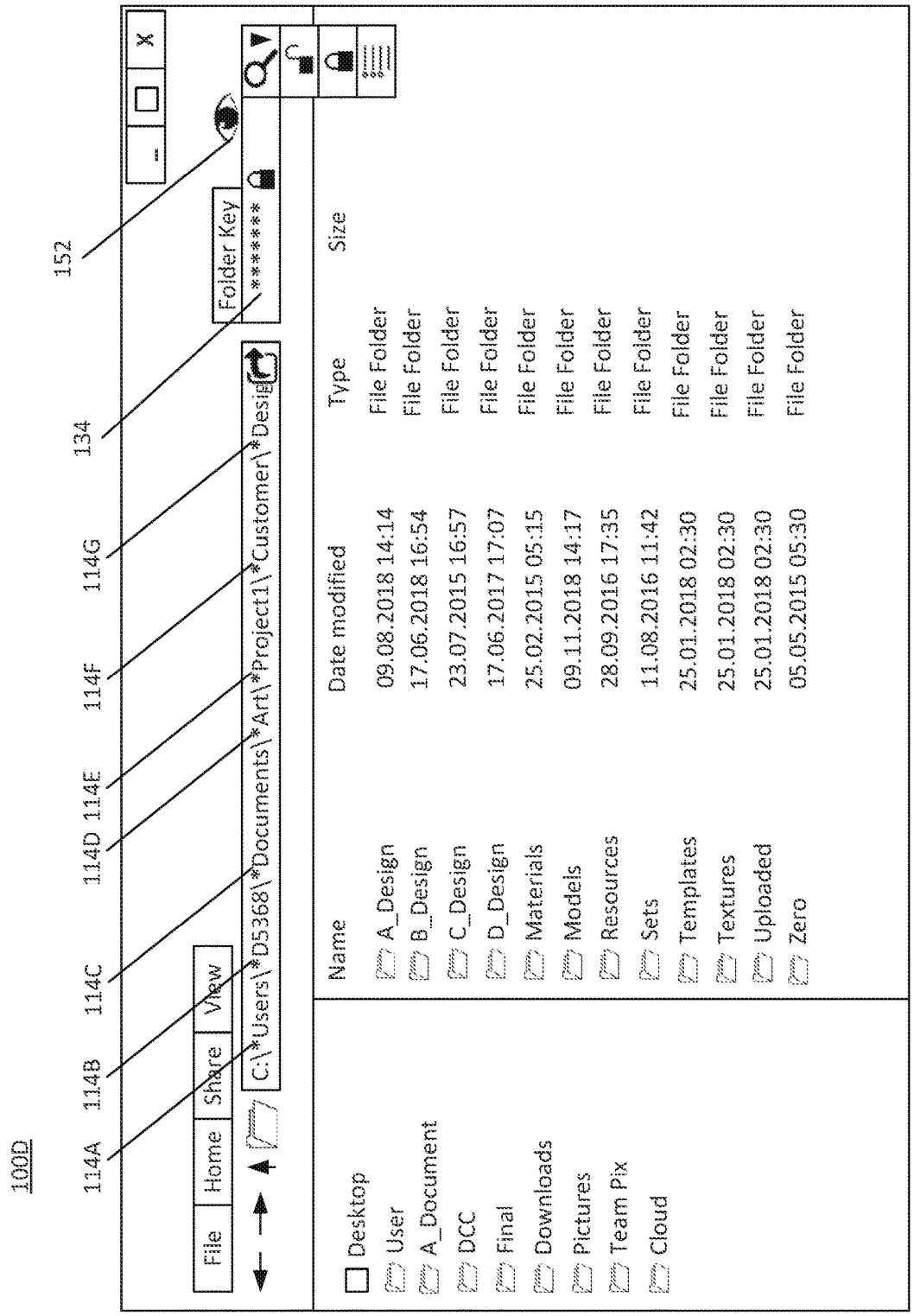
FIG. 1D depicts a block diagram of a GUI displaying a hidden folder key, according to some embodiments.

When hide icon 150 is toggled to hide folder key 132, GUI 100 may depict an interface similar to GUI 100 displayed in FIG. 1D. FIG. 1D depicts a block diagram of GUI 100 displaying a hidden folder key 134, according to some embodiments. When hide icon 150 is selected, folder key 132 may be hidden. In an embodiment, hiding folder key 132 may include replacing the symbols of folder key 132 with different symbols. This may generate a hidden folder key 134. For example, the symbols may be replaced with asterisks. In an embodiment, the symbols may be replaced with other symbols. The symbols 112 displayed in folder path interface 110 may also be replaced with hidden symbols 114. These symbols may match the symbols in hidden folder key 134. Using hidden folder key 134 may provide added security similar to a hidden password. For example, a user may type a hidden folder key 134 in a private manner.

In an embodiment, toggling hide icon 150 may change hide icon 150 into show icon 152. With GUI 100 displaying a hidden folder key 134 and/or hidden symbols 114, a user may decide to show folder key 132 and/or symbols 112. Toggling show icon 152 may display folder key 132 and/or GUI 100 as depicted in FIG. 1C.

Figure 2A:
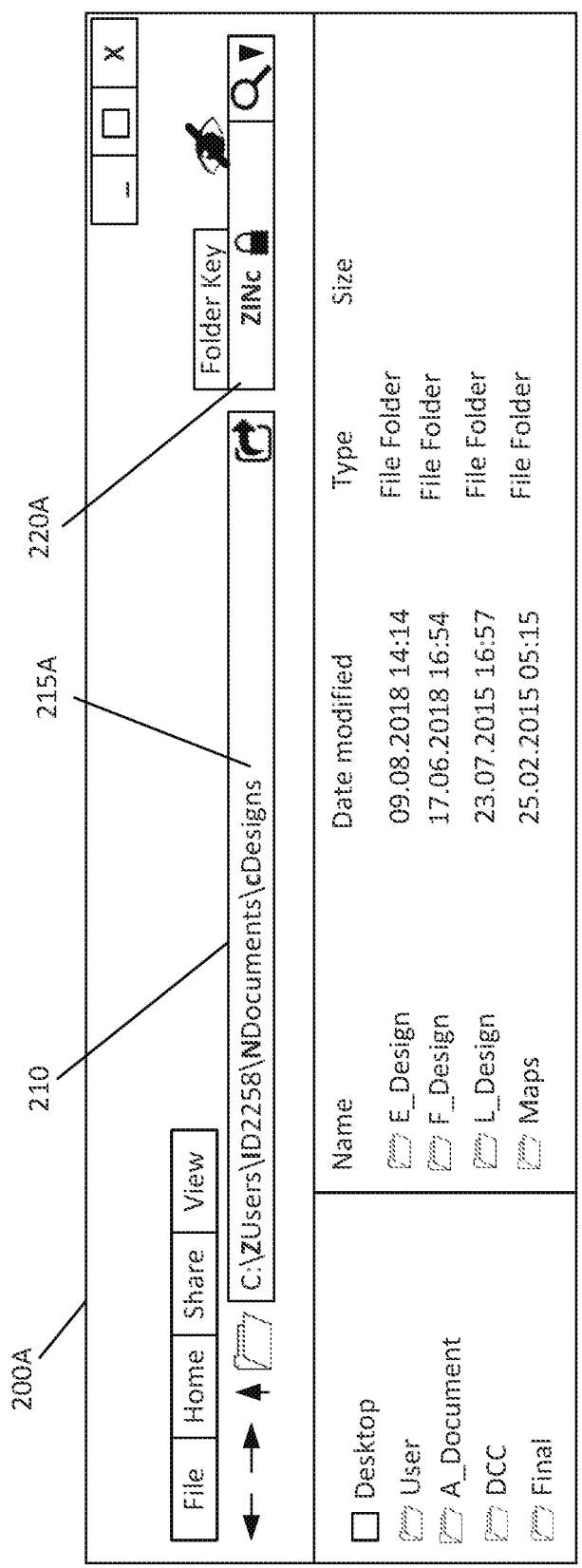
FIG. 2A depicts a block diagram of a GUI displaying a terminated folder key, according to some embodiments.

FIG. 2A depicts a block diagram of a GUI 200A displaying a complete folder key 220A, according to some embodiments. Complete folder key 220A may utilize a final symbol that differs from the other symbols of the folder key. For example, the other symbols of the folder key may utilize upper-case letters while the final symbol may be a lower-case letter. Using a complete folder key 220A may signify the end of a folder key. Complete folder key 220A may indicate that the key is complete and may serve as a visual aid for the user. A complete folder key 220A may be contrasted with an intermediate folder key 215B or 215C as described further with reference to FIG. 2B below.

Complete folder key 220A may correspond to folder path 215A displayed in folder path interface 210. Folder path 215A may include sub-folders. GUI 200A may assign symbols of complete folder key 220A to the sub-folders of folder path 215A. For example, a complete folder key 220A may be "ZINc". The computer system instantiating GUI 200A may assign each symbol of "ZINc" to the sub-folders of folder path 215A.

Figure 2B:
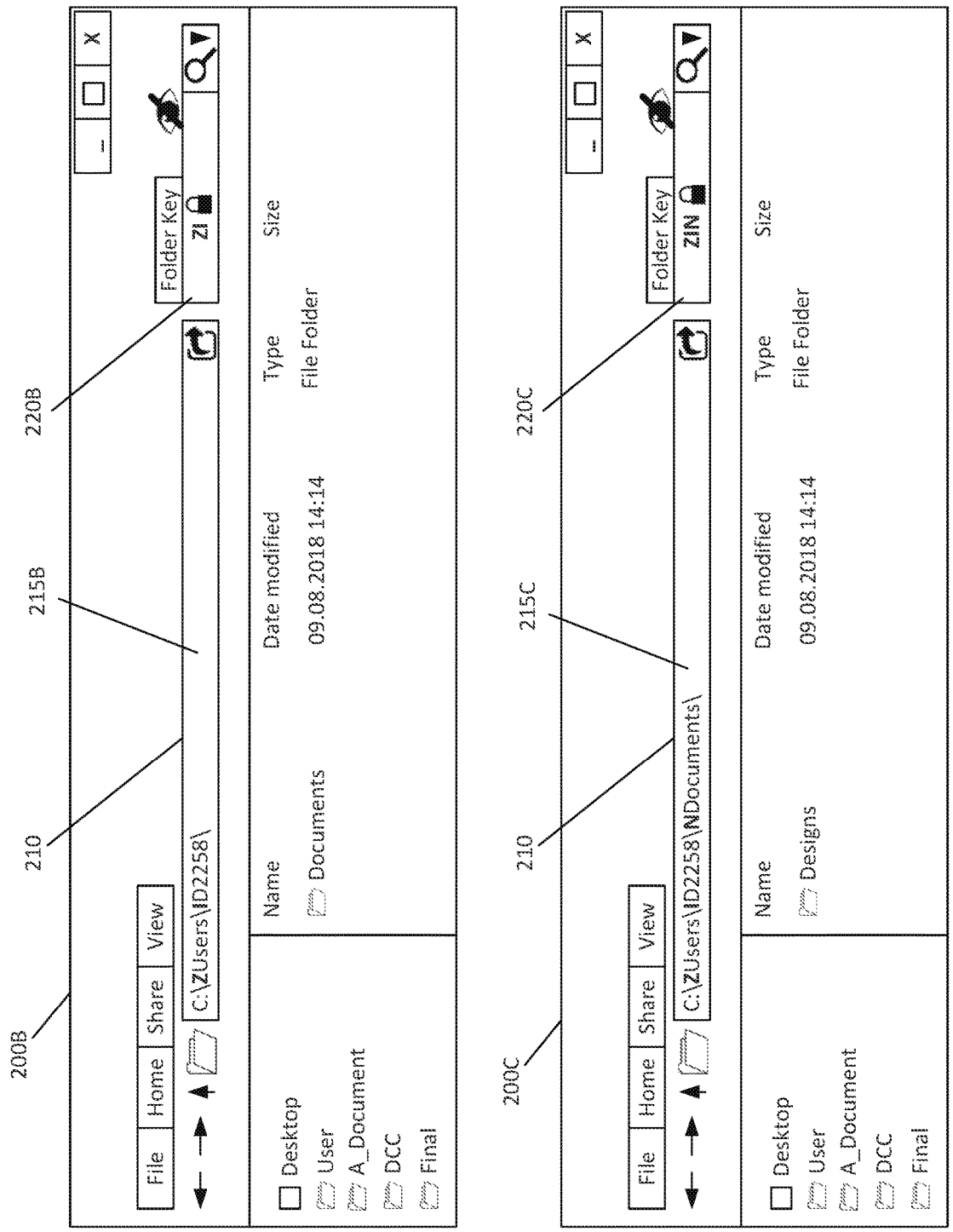
FIG. 2B depicts a block diagram of two GUIs displaying intermediate folder keys, according to some embodiments.

To contrast FIG. 2A, FIG. 2B depicts a block diagram of two GUIs 200B and 200C displaying intermediate folder keys 220B and 220C, according to some embodiments. In an embodiment, a user may utilize intermediate folder keys 220B and/or 220C to navigate between subfolders of a folder path. GUI 200B displays intermediate folder key 220B that includes the symbols "ZI". Intermediate folder key 220B may utilize a subset of the symbols from complete folder key 220A. A user may type "ZI" into the folder key interface and/or may delete the "Nc" symbols from complete folder key 220A to arrive at intermediate folder key 220B. When intermediate folder key 220B appears in the folder key interface, the computer system may display an intermediate folder path 215B in folder path interface 210 corresponding to intermediate folder key 220B.

In this manner, a user may use portions of the folder key to quickly navigate between sub-folders using the folder interface. The user may also quickly return to a previously viewed sub-folder by re-entering the complete folder key 220A. The computer system may recognize the length and/or symbols of a folder key that has been entered and may retrieve the corresponding sub-folder. In this manner, the user may avoid browsing different sub-folders and/or may avoid viewing unnecessary sub-folders when navigating. Further, the implementation of the folder key data structure allows the computer system to reduce the amount of system resources expended during the navigation between sub-folders. Because the computer system utilizes a complete folder key 220A and/or an intermediate folder key 220B or 220C to directly navigate to a sub-folder, the computer system may avoid loading, retrieving, and/or displaying unnecessary sub-folders.

Similar to GUI 200B, GUI 200C displays the addition of a symbol "N" to intermediate folder key 220B to produce intermediate folder key 220C "ZIN". A user may remove symbols and/or add symbols into the folder key interface to navigate between sub-folders of a folder path. For example, when a user adds the symbol "N" to generate intermediate folder key 220C, the computer system may retrieve the corresponding folder path 215C. In this manner, the user may navigate between sub-folders.

Figure 3:
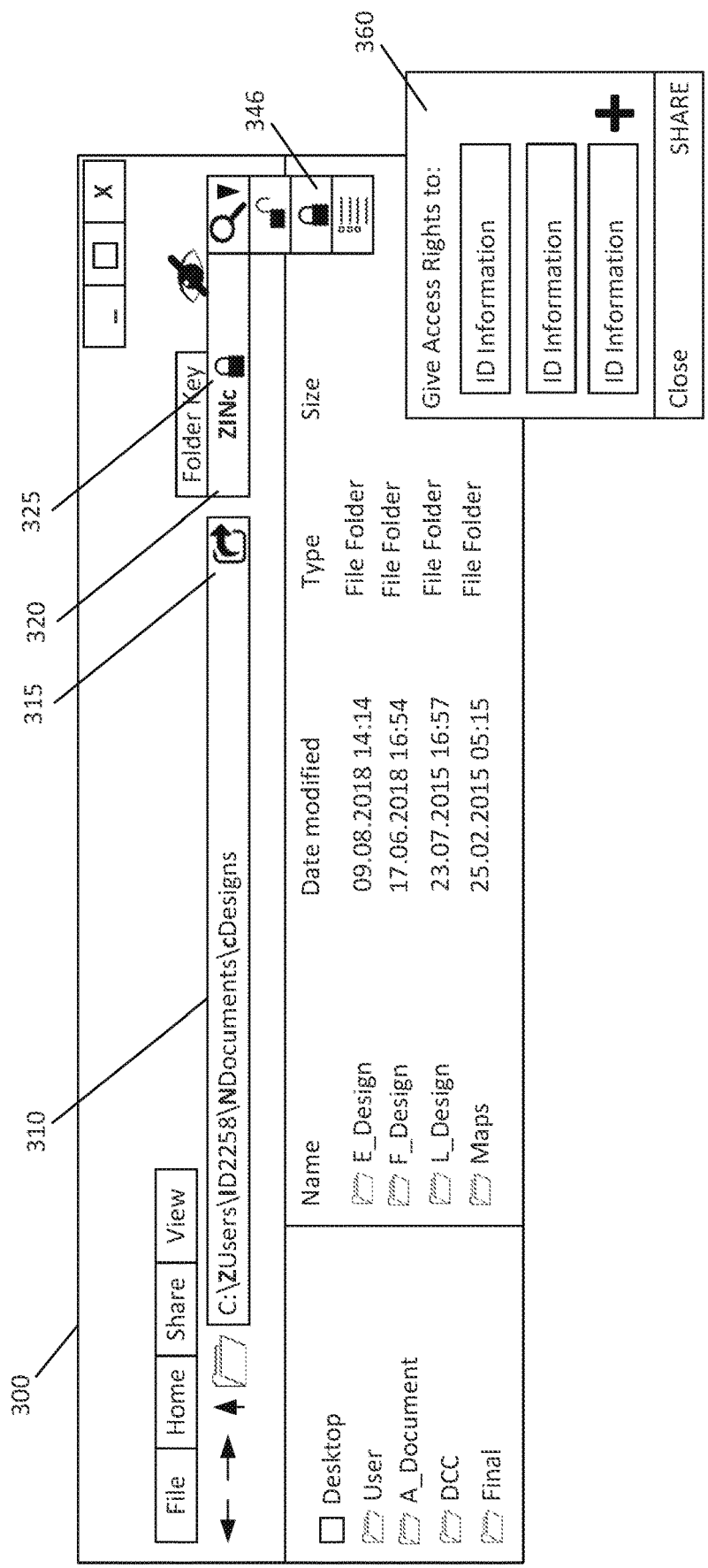
FIG. 3 depicts a block diagram of a GUI displaying a private assignment icon, according to some embodiments.

FIG. 3 depicts a block diagram of GUI 300 displaying a private assignment icon 346, according to some embodiments. Private assignment icon 346 may act in a manner similar to private assignment icon 146. GUI 300 may include folder path interface 310, share icon 115, folder key 320, and private assignment icon 346. A user may type folder key 320 into the folder key interface and then select private assignment icon 346. When a user selects private assignment icon 346, GUI 300 may display lock icon 325. Lock icon 325 may indicate that folder key 320 is private. Lock icon 325 may be a visual indicator for a user to remind the user that permissions may be associated with folder key 320.

In an embodiment, after selecting private assignment icon 346, the computer system may display a prompt 360 on GUI 300 requesting identification information related to the users allowed to use folder key 320. Based on this selection, the user may use input boxes and/or selection boxes to identify users. In an embodiment, the user may type an identification into an input box in prompt 360. For example, the user may type an email address, phone number, and/or a user account name. After inputting user identification, the user may choose to share the folder key with the selected individuals using a share button on prompt 360. In an embodiment, prompt 360 may include a button and/or icon to close prompt 360 and/or cancel the action of sharing folder key 320.

In an embodiment, the user may begin to type a name and the computer system may attempt to automatically fill the identification information. In an embodiment, the user may select individuals from a list of individuals stored by the computer system. The user may select and/or input multiple individuals. After selecting, the user may choose to share the folder key with the selected individuals using a share button on prompt 360. If an individual without permissions attempts to use folder key 320, the computer system may reject the attempt and/or record the rejected attempt. In an embodiment, a rejected attempt may also cause the computer system to send a notification message to an administrator.

In an embodiment, after folder key 320 has been designated as a private key, a user may view a list of the individuals having permission to use the key. For example, a user may hover a cursor and/or interact with folder key 320 or lock icon 325 and/or select share icon 315. In response, GUI 300 may display a list of individuals and/or display prompt 360 which may list the individuals. In an embodiment, a user may edit this list. The user may add and/or remove individuals from the list. In this manner, folder key 320 may act as a rights management data structure based on user permissions. In an embodiment, a user may select share icon 315 to access prompt 360 to designate individuals having permissions to use folder key 320. In an embodiment, when a user is designated using prompt 360, the computer system instantiating GUI 300 may send a notification to the user using the inputted user identification information and/or based on internal data corresponding to a selected individual.

Figure 4:
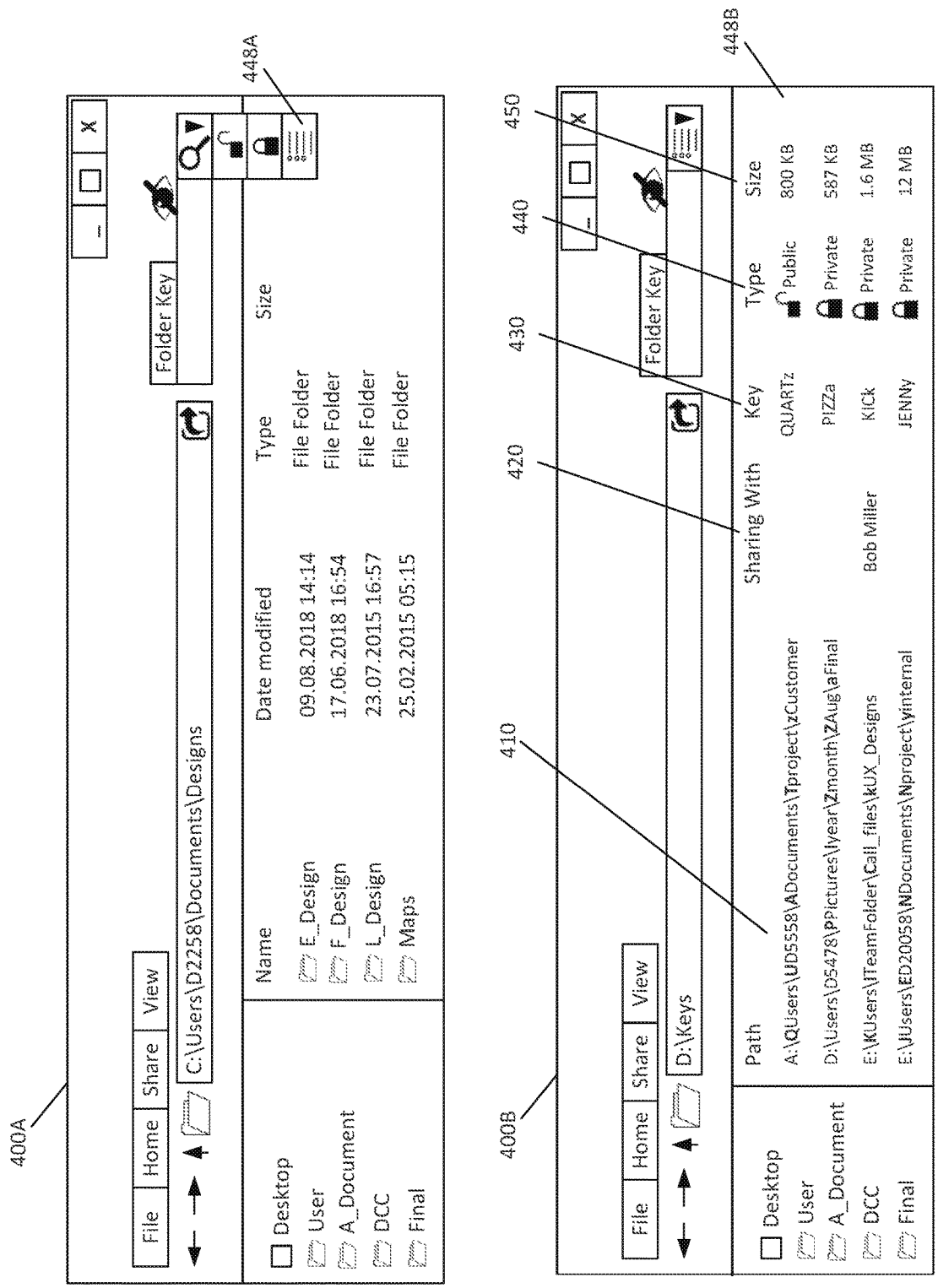
FIG. 4 depicts a block diagram of two GUIs displaying a list toggle and a folder key list, according to some embodiments.

FIG. 4 depicts a block diagram of two GUIs 400A and 400B displaying a list toggle 448A and a folder key list 448B, according to some embodiments. In an embodiment, a computer system may instantiate GUI 400A. GUI 400A may include folder key list toggle 448A. Folder key list toggle 448A may be similar to key list icon 148 as described with reference to FIG. 1B. When a user selects folder key list toggle 448A, the computer system may instantiate GUI 400B.

GUI 400B may display folder key list 448B. Folder key list 448B may be a portion of GUI 400B displaying folder keys that have been previously saved in computer system memory. Folder key list 448B may include one or more categories describing the stored folder keys. For example, folder key list 448B may provide information using columns. The columns may include folder path column 410, shared user column 420, key column 430, privacy type column 440, and/or size column 450.

Folder path column 410 may display folder paths corresponding to saved folder keys. The folder paths may include symbols from the folder keys corresponding to sub-folders. For example, the sub-folders may include a symbol to depict the correspondence between the sub-folder and the symbol. In an embodiment, the symbol may be visually distinguished from the sub-folder listed in folder path column 410. For example, the symbol may be a different font and/or color from the sub-folder name. In this manner, a user may more easily see the difference between the symbol and the sub-folder name.

Shared user column 420 may display user names and/or identifications that have been granted permission to use the folder key. In an embodiment, shared user column 420 may indicate that a user has been granted permission to view a particular sub-folder. The sub-folder may appear hidden to users not listed in shared user column 420. In an embodiment, a user viewing GUI 400B may hover a cursor over row of shared user column 420 to view a list of names and/or identification information identifying individuals granted permission to use the corresponding folder key. In this manner, a user may view GUI 400B and folder key list 448B to quickly determine the users having access to the folder keys and/or sub-folders. In an embodiment, a user may edit the shared individuals listed in shared user column 420 using folder key list 448B. For example, a prompt, such as prompt 360, may allow the user to add and/or remove individuals from shared user column 420 for a particular folder path and folder key. In an embodiment, the user may group folder paths and/or folder keys for faster management of permissions.

Key column 430 may include the folder keys corresponding to the folder paths listed in folder path column 410. The folder keys may include symbols. In an embodiment, the computer system instantiating GUI 400B may utilize a completed folder key structure and may utilize a terminating symbol that differs from the other symbols of the folder key. For example, the terminating symbol may be a lower case letter while the other symbols of the folder key may be an upper case letter. This difference may allow a user to quickly discern whether a folder key is complete or whether the folder key is intermediate.

In an embodiment, a user may edit the folder keys listed in key column 430. When a user edits a folder key, the computer system may update the symbols depicted in folder path column 410. The computer system may also store the updated folder key. Using folder key list 448B may allow a user to quickly modify and/or manage stored folder keys. Rather than instantiating each folder key and the contents associated with the folder key each time a user chooses to modify the folder key, the computer system may provide folder key list 448B to allow for folder key management. In this manner, the computer system may save resources by not instantiating each sub-folder when a user wishes to modify a folder key.

Privacy type column 440 may indicate whether a folder key and/or a sub-folder of the folder path is public or private. A user may quickly view text and/or an icon in privacy type column to determine the privacy settings. A user may modify the privacy setting in privacy type column 440. In an embodiment, the user may use privacy type column 440 with shared user column 420 to manage permissions related to folder columns. In this manner, using folder key list 448B may allow a user to quickly access and/or manipulate permissions related to different folder keys.

The computer system may also store updated permissions. Rather than instantiating each folder key and the contents associated with the folder key each time a user chooses to modify permissions related to the folder key and/or sub-folder, the computer system may provide folder key list 448B to allow for permission management. In this manner, the computer system may save resources by not instantiating each sub-folder when a user wishes to modify a permission.

Folder key list 448B may further include a size column 450. Size column 450 may include size information related to the amount of memory space occupied by the contents of the sub-folder indicated by a folder path.

Figure 5A:
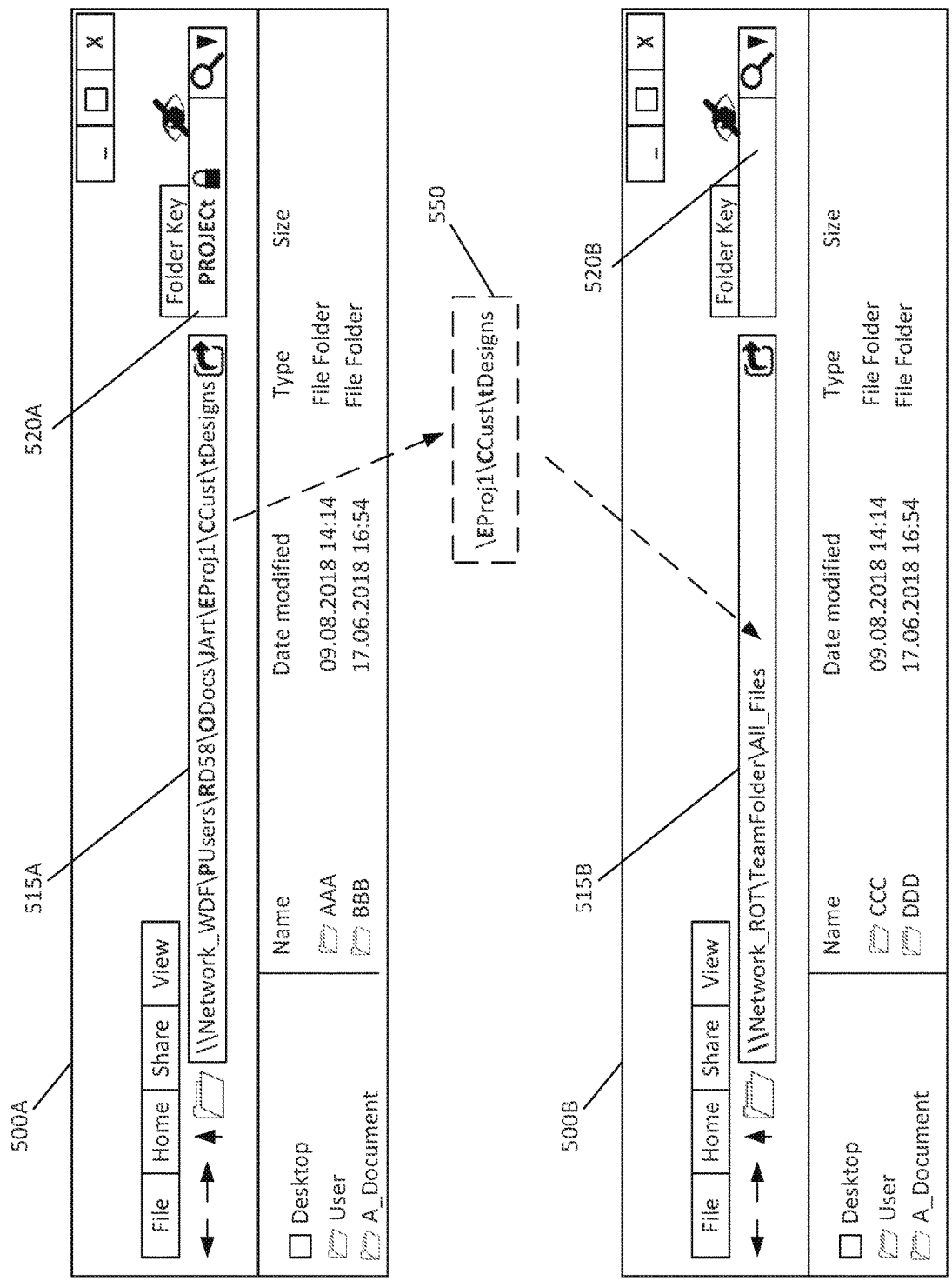
FIG. 5A depicts a block diagram of two GUIs displaying a folder key movement interaction, according to some embodiments.

FIG. 5A depicts a block diagram of two GUIs 500A and 500B displaying a folder key movement interaction, according to some embodiments. FIG. 5A depicts an embodiment of the movement of a subfolder from one parent folder to another parent folder. GUI 500A may include a folder path 515A with a corresponding folder key 520A. In an embodiment, the folder key 520A may be a private folder key. The sub-folder corresponding to the "t" symbol may be a private sub-folder.

A user may wish to move one or more sub-folders from a first parent folder to a second parent folder. In an embodiment, the user may desire that the permissions specified for the one or more sub-folders be preserved during the move. To accomplish this movement, the computer system may retain metadata related to the sub-folders, so that when a sub-folder is moved, the permissions move with the sub-folder. In an embodiment, the portions of the folder key corresponding to the sub-folders may also be moved.

In an embodiment, GUI 500B may depict a folder path 515B that is the target of a movement of sub-folders from folder path 515A. Initially, GUI 500B may not have a folder key 520B. Folder key 520B may become filled after a user moves sub-folders from folder path 515A to 515B. To perform this movement, a user may select a subset 550 of sub-folders from folder path 515A. In an illustrative example, a user may select three sub-folders. The user may drag subset 550 from GUI 500A to GUI 500B and place subset 550 into folder path 515B. In this case, the movement of subset 550 may remove the sub-folders from folder path 515A and add the sub-folders to folder path 515B.

Figure 5B:
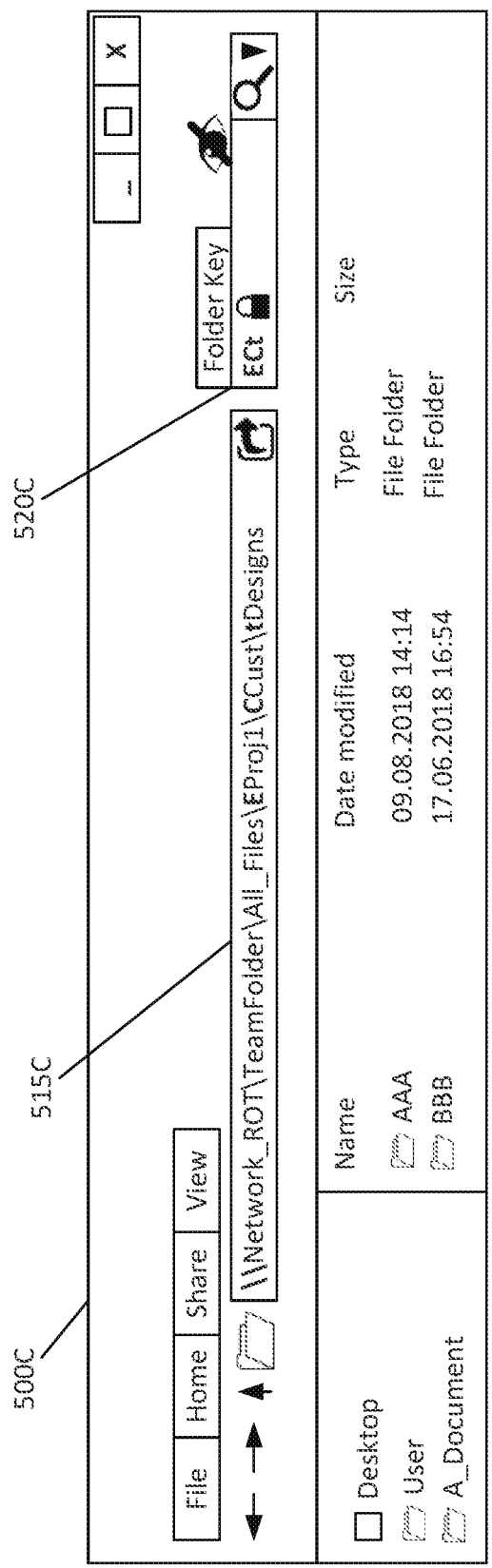
FIG. 5B depicts a block diagram of a GUI displaying folder key that has been moved, according to some embodiments.

In an embodiment, this movement may also move the corresponding symbols from the folder key 520A. For example, if folder key 520A includes the symbols "PROJECt" and the user moves the final three sub-folders in subset 550, the computer system may also move the final three symbols: "ECt". FIG. 5B depicts a block diagram of GUI 500C displaying folder key that has been moved, according to some embodiments. For example, folder key 520C may be the final three symbols. Folder path 515C may also depict an updated version of folder path 515B. Folder path 515C may be folder path 515B with the added sub-folders from subset 550 taken from folder path 515A. Using folder key 520C, a user may be able to access the new folder path 515C based on the moved sub-folders. In an embodiment, the permissions related to the sub-folder may be preserved and may be shown with a lock icon near folder key 520C.

In an embodiment, a movement interaction moving subset 550 from folder path 515A to folder path 515B may copy the sub-folders from subset 550 into folder path 515B to generate folder path 515C. In an embodiment, the folder key 520A "PROJECt" may remain a valid folder key for folder path 515A while folder key 520C "ECt" may correspond to folder path 515C. In an embodiment, the computer system may prompt the user to supply a different folder key 520C to distinguish between the folder paths 515B and 515C.

FIG. 5A and FIG. 5B also depict an embodiment of mixed permissions according to some embodiments. For example, folder path 515A may be a private folder path. Folder path 515B may be a public folder path. When a user moves subset 550 into public folder path 515B, the computer system may preserve the private nature of the sub-folders. For example, the individuals previously designate may still be able to access the private sub-folders. The computer system may not grant access to individuals who have not been designated. In an embodiment, the computer system may hide the sub-folders from individuals who have not been designated. In an embodiment, to access the hidden sub-folders, the computer system may require a user to supply folder key 520C.

Even if an individual has not been specifically granted permission, the individual may still be able to access the folders from folder path 515B and/or the other content stored in folder path 515B even after subset 550 has been moved. In this manner, folder path 515B may include a mix of public and private folders and content.

FIG. 6 depicts a flowchart illustrating a method 600 for generating a folder key, according to some embodiments. Method 600 shall be described with reference to FIG. 1A, FIG. 1B, FIG. 1C, and FIG. 8; however, method 600 is not limited to that example embodiment.

In an embodiment, computer system 800 may utilize method 600 to generate a folder key. The foregoing description will describe an embodiment of the execution of method 600 with respect to computer system 800. While method 600 is described with reference to computer system 800, method 600 may be executed on any computing device and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 6, as will be understood by a person of ordinary skill in the art.

In an embodiment, at 610, computer system 800 may detect navigation to a folder path via a graphical user interface (GUI) 100, wherein the folder path includes one or more sub-folders. The sub-folders may be sub-folders of the folder path and/or may represent a hierarchy of sub-folders. A user may use GUI 100 to navigate to a particular sub-folder. In an embodiment, a user may input text as a folder path and/or may click icons displayed on GUI 100 to arrive at a particular folder path and sub-folder. Computer system 800 may track and/or monitor the folder path and/or sub-folder currently displayed. Determining the navigation may allow computer system 800 to pre-load metadata identifying a particular sub-folder and/or to prepare the metadata for association with a folder key 132.

At 620, computer system 800 may receive an interaction with a portion of GUI 100 to assign a folder key 132 to the folder path. In an embodiment, a user may input text representing a folder key 132 to computer system 800. Computer system 800 may display this text in GUI 100 in folder key interface 130. In an embodiment, the user may select a portion of GUI 100 to cause computer system 800 to assign folder key 132 to the folder path. For example, the user may select public assignment icon 144 and/or private assignment icon 146. The selection may be a click and/or a tap. Computer system 800 may then assign the provided folder key 132 to the folder path.

In an embodiment, computer system 800 may provide a folder key 132 and assign the provided folder key 132 to the folder path. For example, a user may not input text representing a folder key 132. Instead, computer system 800 may utilize a dictionary of terms that may be stored in memory and/or found in an Internet database to determine a folder key 132. In an embodiment, the folder key may utilize the same number of characters as the number of sub-folders in the folder path. In this manner, a user may request that computer system 800 provide and assign a folder key 132 to the folder path.

At 630, computer system 800 may assign one or more symbols 112 of folder key 132 to one or more sub-folders of the folder path. For example, the symbols 112 may have a one-to-one correlation to the sub-folders. In this manner, if a user types a portion of the folder key 132 using a subset of the symbols 112, the user may navigate between different sub-folders of the folder path. Computer system 800 may perform this navigation based on metadata associating the one or more symbols 112 with the one or more sub-folders of the folder path.

At 640, computer system 800 may store the folder key 132 in memory with an association to the folder path. If computer system 800 is a local device, memory may be hardware such as, for example, non-volatile memory to store metadata associating folder key 132 with the folder path. If computer system 800 uses a network and/or cloud computing architecture, memory may be a database and/or other memory accessible by multiple computing devices. In an embodiment, storing folder key 132 may allow computer system 800 to retrieve folder key 132 at a later time. For example, a user may wish to view a list of folder keys 132 and corresponding folder paths. Computer system 800 may generate GUI 400B depicted in FIG. 4 to display the folder key 132 and corresponding folder path.

At 650, computer system 800 may optionally store metadata associating the one or more symbols 112 of the folder key 132 to the one or more sub-folders of the folder path. In an embodiment, computer system 800 may segment folder key 132 in a manner similar to the folder key 132 and symbols 112 depicted in FIG. 1C. Storing this metadata may allow a user to input a portion of the folder key 132 and allow computer system 800 to recognize the sub-folder corresponding to the portion of the folder key 132. For example, a user may input intermediate folder keys 220B and 220C as depicted in FIG. 2B. Computer system 800 may then use stored metadata to retrieve the corresponding sub-folder corresponding to the intermediate folder key 220B or 220C.

In this manner, computer system 800 may use method 600 to generate a folder key 132 within computer system 800 and/or to store folder key 132 metadata in computer system 800 memory. Folder key 132 may be supplied by the user and/or may be supplied by computer system 800. Via method 600, computer system 800 may store the folder key 132 in memory with an association to the folder path.

Figure 7:
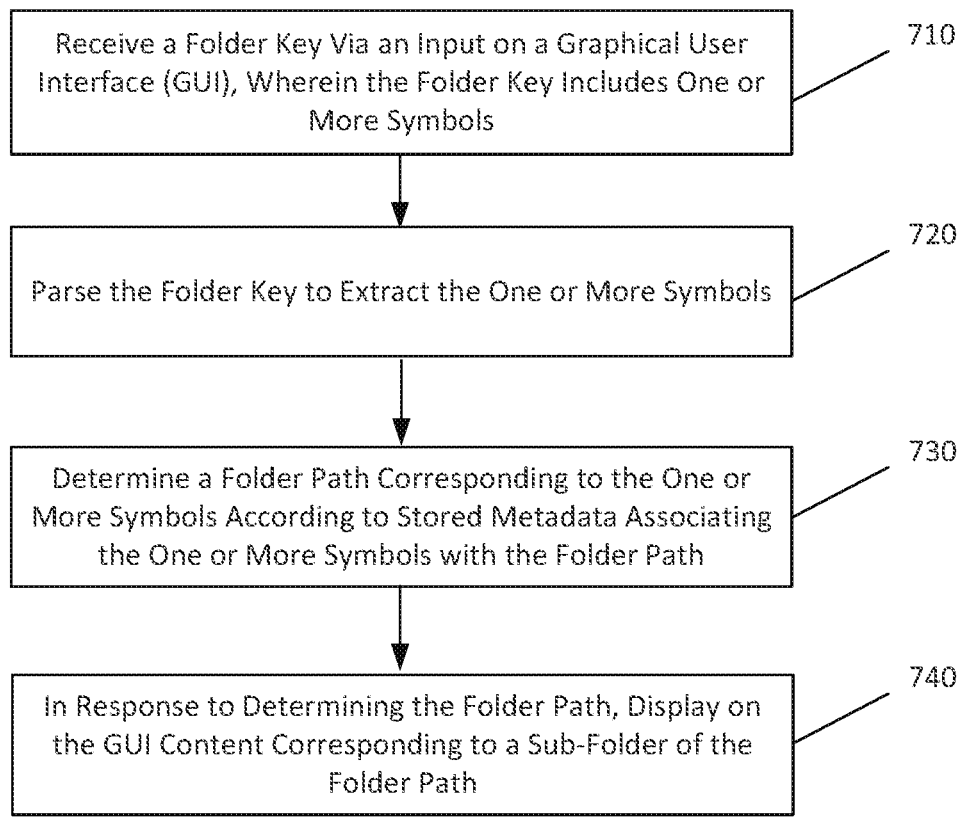
FIG. 7 depicts a flowchart illustrating a method for accessing a folder path corresponding to a folder key, according to some embodiments.

FIG. 7 depicts a flowchart illustrating a method 700 for accessing a folder path corresponding to a folder key, according to some embodiments. Method 700 shall be described with reference to FIG. 1A, FIG. 1B, FIG. 1C, and FIG. 8; however, method 700 is not limited to that example embodiment.

In an embodiment, computer system 800 may utilize method 700 to access a folder path corresponding to a folder key. The foregoing description will describe an embodiment of the execution of method 700 with respect to computer system 800. While method 700 is described with reference to computer system 800, method 700 may be executed on any computing device and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 7, as will be understood by a person of ordinary skill in the art.

In an embodiment, at 710, computer system 800 may receive folder key 132 via an input on a graphical user interface (GUI) 100, wherein the folder key 132 includes one or more symbols 112. For example, a user may type and/or select a folder key 132 using GUI 100 and/or other user input devices such as, for example, a mouse and/or keyboard. In an embodiment, the user may input the folder key 132 in folder key interface 130. For example, the user may input the folder key 132 "PROJECT" as depicted in FIG. 1C. In an embodiment, the input may be an intermediate folder key 220B or 220C as depicted in FIG. 2B.

At 720, computer system 800 may parse the folder key 132 to extract the one or more symbols 112. In an embodiment, computer system 800 may determine whether folder key 132 is a complete folder key 220A or an intermediate folder key 220B or 220C. In an embodiment, parsing the folder key 132 may allow computer system 800 to determine the one or more sub-folders corresponding to the symbols 112 of the folder key 132. In an embodiment, computer system 800 may construct the folder path using the symbols 112.

At 730, computer system 800 may determine a folder path corresponding to the one or more symbols 112 according to stored metadata associating the one or more symbols 112 with the folder path. For example, if folder key 132 is a complete folder key 220A, computer system 800 may determine the sub-folder corresponding to the complete folder key 220A. In an embodiment, computer system 800 may recognize a symbol 112 that differs from other symbols of the folder key 132 to recognize a complete folder key 220A. Based on this recognition, computer system 800 may quickly identify and/or retrieve the corresponding sub-folder. At 740, computer system 800 may display on GUI 100 content corresponding to the sub-folder of the determined folder path. For example, computer system 800 may display the contents of the sub-folder corresponding to complete folder key 220A.

In an embodiment, at 730, computer system 800 may determine that folder key 132 is an intermediate folder key 220B or 220C. In this case, computer system 800 may identify and/or retrieve the sub-folder corresponding to a symbol 112 of the folder key 132. In an embodiment, computer system 800 may retrieve the sub-folder corresponding to the final symbol 112. In an embodiment, computer system 800 may pre-load content from other sub-folders of the folder path after identifying an intermediate folder key 220B or 220C. For example, if folder key 220C is "ZIN", computer system 800 may pre-load content corresponding to the sub-folder associated with the complete folder key 220A "ZINc" and/or intermediate folder key 220B "ZI" in volatile memory and/or a memory buffer. At 740, computer system 800 may display the contents of the sub-folder corresponding to folder key 220C while loading and/or buffering content from complete folder key 220A and/or intermediate folder key 220B. In this manner, computer system 800 may more quickly prepare data to be displayed on a GUI 100.

In this manner, computer system 800 may use method 700 to retrieve content and/or sub-folders corresponding to a provided folder key 132.

Figure 8:
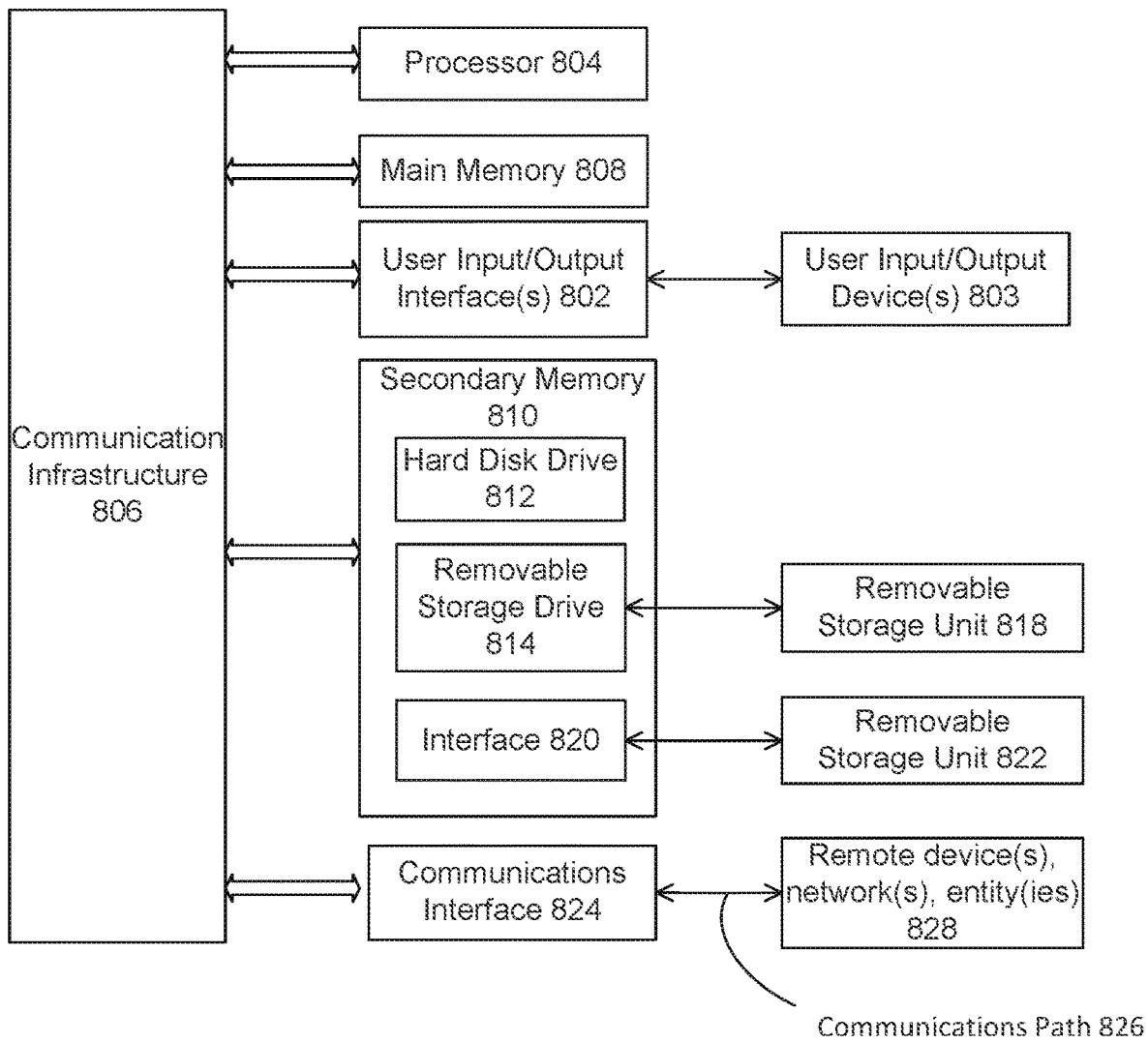
FIG. 8 depicts an example computer system useful for implementing various embodiments.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
generating a graphical user interface (GUI) displaying a folder path, wherein the folder path includes one or more sub-folders;
receiving an interaction with a portion of the GUI to assign a folder key to the folder path, wherein the folder key includes one or more symbols;
storing the folder key in memory with metadata associating the folder key to the folder path such that when the folder key is received via a user input, the folder path is determined based on the metadata associating the folder key to the folder path;
storing, in the memory, first user identification data designating a user permitted to use the folder key;
receiving the folder key and second user identification data from a user attempting to access the folder path; and
comparing the first user identification data with the second user identification data to determine whether the user attempting to access the folder path is permitted to access the folder path.

2. The computer-implemented method of claim 1, further comprising:
determining that the first user identification data matches the second user identification data; and
in response to the determining, providing access to the folder path.

3. The computer-implemented method of claim 1, further comprising:
determining that the first user identification data does not match the second user identification data; and
in response to the determining, rejecting access to the folder path.

4. The computer-implemented method of claim 1, further comprising:
receiving a user selection of a share icon on the GUI; and
in response to receiving the user selection, transmitting the folder key to one or more users within an electronic message.

5. The computer-implemented method of claim 1, further comprising:
generating a second GUI displaying a list of individuals permitted to use the folder key, wherein the list includes the user attempting to access the folder path;
receiving a user interaction via the second GUI to remove the user attempting to access the folder path from the list of individuals; and
in response to the receiving, preventing the user from accessing the folder path.

6. The computer-implemented method of claim 1, further comprising:
receiving a second interaction with the GUI designating the folder key as public; and
in response to the receiving, providing access to the folder path to the user attempting to access the folder path.

7. The computer-implemented method of claim 1, further comprising:
receiving a portion of the folder key and third user identification data from a user attempting to access a sub-folder, wherein the portion includes a subset of the one or more symbols;
identifying the sub-folder from the one or more sub-folders corresponding to the portion of the folder key based on the stored metadata associating the folder key to the folder path; and
comparing the first user identification data with the third user identification data to determine whether the user attempting to access the sub-folder is permitted to access the sub-folder.

8. A system, comprising:
a memory; and
at least one processor coupled to the memory, the at least one processor configured to:
generate a graphical user interface (GUI) displaying a folder path, wherein the folder path includes one or more sub-folders;
receive an interaction with a portion of the GUI to assign a folder key to the folder path, wherein the folder key includes one or more symbols;
store the folder key in the memory with metadata associating the folder key to the folder path such that when the folder key is received via a user input, the folder path is determined based on the metadata associating the folder key to the folder path;
store, in the memory, first user identification data designating a user permitted to use the folder key;
receive the folder key and second user identification data from a user attempting to access the folder path; and
compare the first user identification data with the second user identification data to determine whether the user attempting to access the folder path is permitted to access the folder path.

9. The system of claim 8, wherein the at least one processor is further configured to:
determine that the first user identification data matches the second user identification data; and
in response to the determining, provide access to the folder path.

10. The system of claim 8, wherein the at least one processor is further configured to:
determine that the first user identification data does not match the second user identification data; and
in response to the determining, reject access to the folder path.

11. The system of claim 8, wherein the at least one processor is further configured to:
receive a user selection of a share icon on the GUI; and
in response to receiving the user selection, transmit the folder key to one or more users within an electronic message.

12. The system of claim 8, wherein the at least one processor is further configured to:
generate a second GUI displaying a list of individuals permitted to use the folder key, wherein the list includes the user attempting to access the folder path;
receive a user interaction via the second GUI to remove the user attempting to access the folder path from the list of individuals; and
in response to the receiving, prevent the user from accessing the folder path.

13. The system of claim 8, wherein the at least one processor is further configured to:
receive a second interaction with the GUI designating the folder key as public; and
in response to the receiving, provide access to the folder path to the user attempting to access the folder path.

14. The system of claim 8, wherein the at least one processor is further configured to:
receive a portion of the folder key and third user identification data from a user attempting to access a sub-folder, wherein the portion includes a subset of the one or more symbols;
identify the sub-folder from the one or more sub-folders corresponding to the portion of the folder key based on the stored metadata associating the folder key to the folder path; and
compare the first user identification data with the third user identification data to determine whether the user attempting to access the sub-folder is permitted to access the sub-folder.

15. A non-transitory computer-readable device having instructions stored thereon that, when executed by at least one computing device, cause the at least one computing device to perform operations comprising:
generating a graphical user interface (GUI) displaying a folder path, wherein the folder path includes one or more sub-folders;
receiving an interaction with a portion of the GUI to assign a folder key to the folder path, wherein the folder key includes one or more symbols;
storing the folder key in memory with metadata associating the folder key to the folder path such that when the folder key is received via a user input, the folder path is determined based on the metadata associating the folder key to the folder path;
storing, in the memory, first user identification data designating a user permitted to use the folder key;
receiving the folder key and second user identification data from a user attempting to access the folder path; and
comparing the first user identification data with the second user identification data to determine whether the user attempting to access the folder path is permitted to access the folder path.

16. The non-transitory computer-readable device of claim 15, the storing further comprising:
determining that the first user identification data matches the second user identification data; and
in response to the determining, providing access to the folder path.

17. The non-transitory computer-readable device of claim 15, the operations further comprising:
- determining that the first user identification data does not match the second user identification data; and
- in response to the determining, rejecting access to the folder path.

18. The non-transitory computer-readable device of claim 15, the operations further comprising:
- receiving a user selection of a share icon on the GUI; and
- in response to receiving the user selection, transmitting the folder key to one or more users within an electronic message.

19. The non-transitory computer-readable device of claim 15, the operations further comprising:
- generating a second GUI displaying a list of individuals permitted to use the folder key, wherein the list includes the user attempting to access the folder path;
- receiving a user interaction via the second GUI to remove the user attempting to access the folder path from the list of individuals; and
- in response to the receiving, preventing the user from accessing the folder path.

20. The non-transitory computer-readable device of claim 15, the operations further comprising:
- receiving a portion of the folder key and third user identification data from a user attempting to access a sub-folder, wherein the portion includes a subset of the one or more symbols;
- identifying the sub-folder from the one or more sub-folders corresponding to the portion of the folder key based on the stored metadata associating the folder key to the folder path; and
- comparing the first user identification data with the third user identification data to determine whether the user attempting to access the sub-folder is permitted to access the sub-folder.

* * * * *